Nov. 29, 1960     A. I. KAHLE     2,962,028
ADJUSTABLE THRESHING CYLINDER

Filed Nov. 7, 1957     2 Sheets-Sheet 1

INVENTOR.
ALFRED I. KAHLE,
BY
ATTORNEYS.

Nov. 29, 1960 A. I. KAHLE 2,962,028
ADJUSTABLE THRESHING CYLINDER
Filed Nov. 7, 1957 2 Sheets-Sheet 2

INVENTOR.
ALFRED I. KAHLE,
BY
ATTORNEYS.

2,962,028
ADJUSTABLE THRESHING CYLINDER

Alfred I. Kahle, R.R. 4, Defiance, Ohio

Filed Nov. 7, 1957, Ser. No. 695,116

4 Claims. (Cl. 130—27)

This invention relates to grain-harvesting combines are more particularly to a means for facilitating the adjustment of the threshing cylinder in a commercial form of combine.

In the particular form of combine for use in which my invention has been developed, the threshing cylinder is adjustable toward and away from its associated concave through the medium of sliding bearings which can be clamped in any desired position of adjustment. Four clamp bolts in addition to a bearing-positioning bolt are associated with each bearing; and, as a result, repositioning of the cylinder requires considerable time and effort.

In carrying out my invention in its preferred form, the clamping bolts which lock each bearing in adjusted position are replaced with a quick-operating clamping cam, and at least one of the bearing-adjusting bolts is also replaced by a cam. The locking cams are so constructed, as will be brought out in detail hereinafter, that no undesirable forces are applied to other parts of the structure.

Other features of the invention will become apparent from the accompanying drawings in which.

Figure 1:
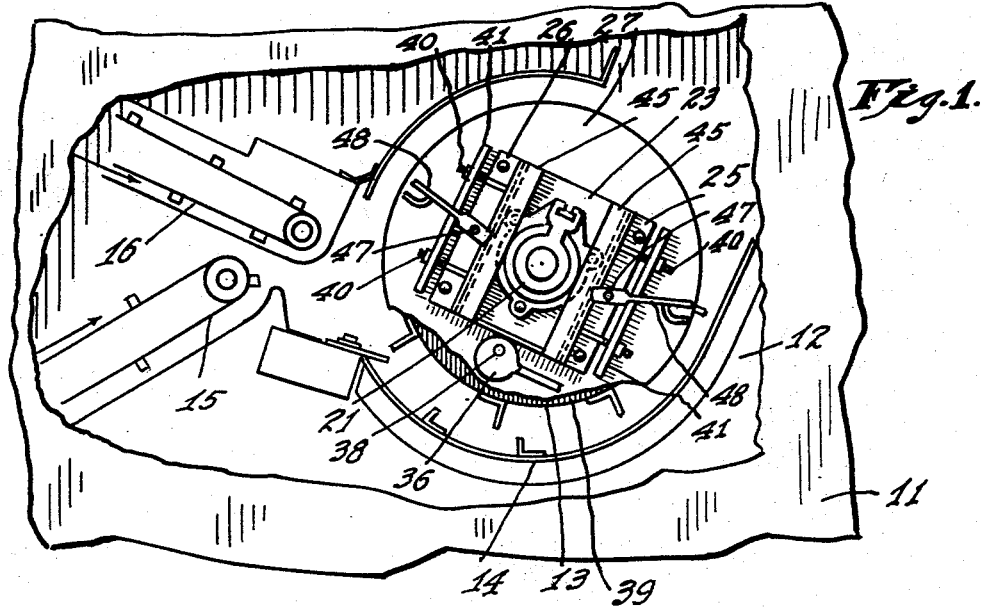
Fig. 1 is a fragmental end elevation of the threshing chamber of a commercial form of combine, with a portion of the end wall of the chamber broken away to show the threshing mechanism and related parts.

The threshing structure illustrated in the drawings is one embodied in a combine currently being manufactured and marketed in this country. The combine, which is not shown in its entirety, embodies a housing 10 which has end walls 11 and 12 and which encloses a threshing cylinder 13 and the associated concave 14. Conveyors 15 and 16 are embodied in the combine to convey material to and from the threshing chamber.

In the operation of a combine having the elements just described, it is frequently necessary to vary the distance between the concave 14 and the axis of the cylinder 13. In the commercial machine above referred to, the shaft 20 of the cylinder 13 projects through the end walls 11 and 12 and is received in bearings 21 and 22 adapted for adjustment toward and away from the concave 14. To this end, bearings 21 and 22 are secured respectively in shoes 23 and 24 of U-cross section, such shoes being slidably received between the parallel legs of two angle irons 25 and 26 secured to end plates 27 and 28 which cover openings in the end walls 11 and 12 of the housing 10. In the commercial construction, shims 30 are disposed between the sides of the shoes 23 and 24 and the respectively adjacent parallel legs of the angle irons 25 and 26. The sides of the shoes 23 and 24 are slotted for the reception of clamp bolts which extend through openings in the shims 30 and in the parallel legs of the angle irons 25 and 26 in such a manner that when the bolts are tightened the bearing will be locked in fixed position along its path of adjusting movement. To facilitate more or less precise adjustment of each bearing, it is provided on its upper side with a slot for the reception of the head of a bolt 32 which extends upwardly through a bracket 33 secured to the end plate 27 or 28. Nuts 34 are disposed on each bolt 32 to engage an upwardly presented surface on the bracket 33 so that, by adjustment of the nuts, the bearing can be raised or lowered. It is only necessary that the bearing-adjusting means operate to hold the bearings upwardly, as the force of gravity may be depended upon to lower the cylinder 13 and the bearings to the limit permitted by adjustment of the nuts 34.

The bearing-adjusting means such as described has the disadvantage that considerable time is required to change the position of the threshing cylinder 13. Specifically, all the clamp bolts associated with the sides of the bearing shoes 23 and 24 must be individually loosened, the nuts 34 at each end of the threshing cylinder adjusted, and the clamp bolts retightened. In the commercial machine, this operation takes so much time and trouble that the operator is frequently disposed to avoid adjusting the threshing cylinder and in consequence loses grain.

Figure 2:
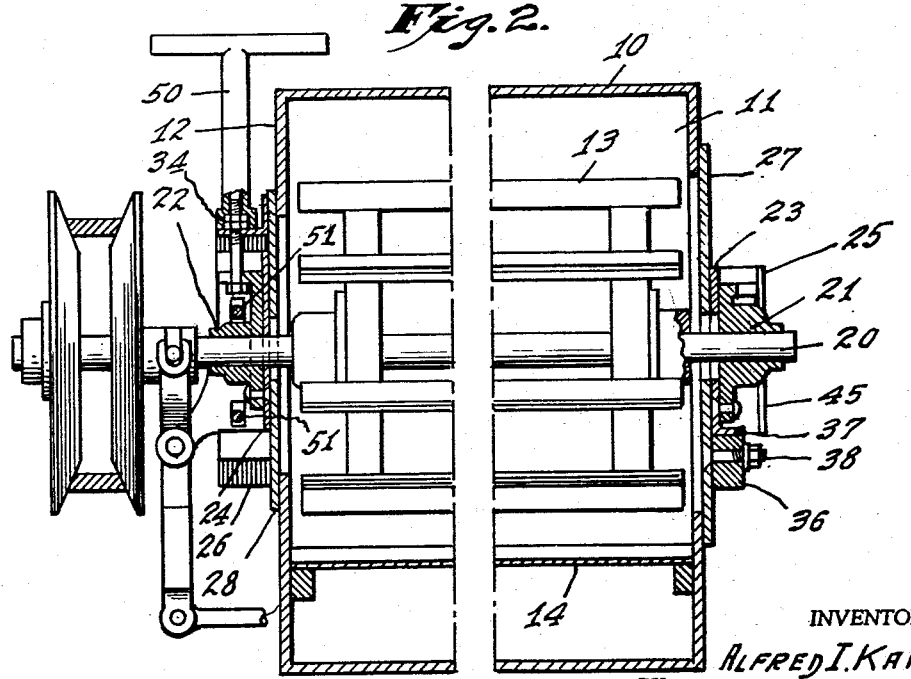
Fig. 2 is an axial section through the threshing chamber on the line 2—2 of Fig. 1.
Figure 3:
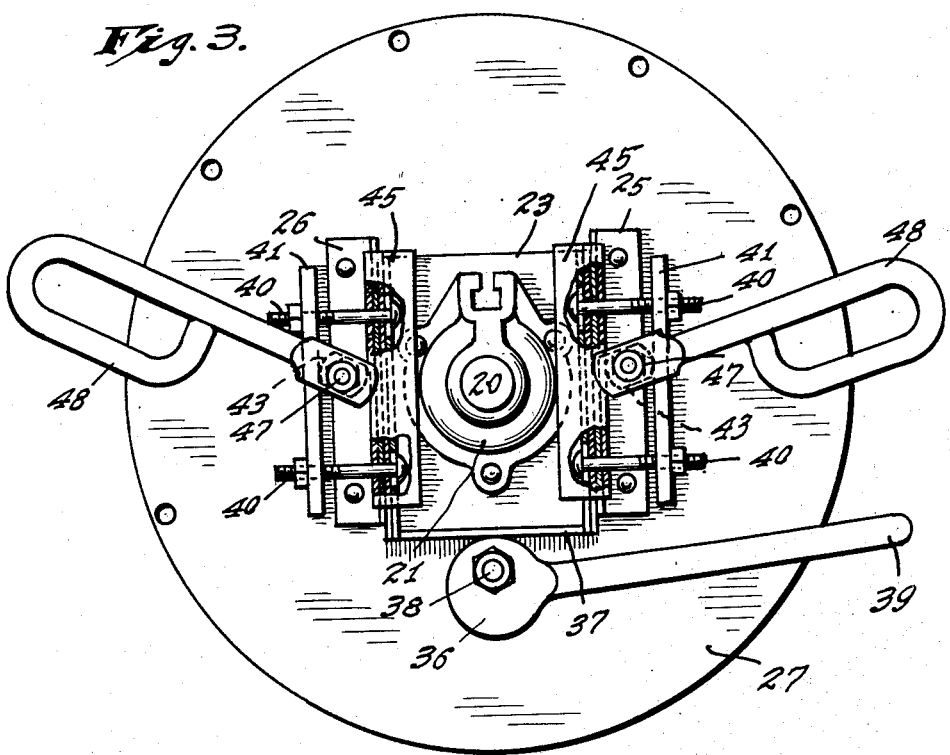
Fig. 3 is an end elevation similar to Fig. 1 but on an enlarged scale.

In employing my invention to facilitate adjustment of the threshing cylinder, I use different arrangements at opposite ends of the housing 11 and 12, such different arrangements being desirable by reason of the fact that other elements of the commercial combine prevent the use of the same construction at both ends of the housing. The right-hand end of the housing, as shown in Fig. 2, is more accessible in the standard machine than is the left-hand end. At the right-hand end I remove the bolt 32 and replace it with a cam 36 pivotally mounted on the end plate 27 in position to engage a cam-abutment 37 which I weld on the lower end of the shoe 23. Such cam, which may be essentially circular and pivoted to the plate 27 by a bolt 38 located eccentrically of the cam, is conveniently provided with a laterally projecting handle 39 by which its position about the axis of the bolt 38 may be readily adjusted. The conventional clamp bolts are replaced by longer bolts 40 which project outwardly well beyond the parallel legs of the angle irons 25 and 26 to be received in openings in a rigid bar 41. Between each of the parallel legs of the angle irons 25 and 26 and its associated bar 41 I pivot a rotatable cam 43 so shaped that as it is rotated in one direction it operates to force the associated bar 41 outwardly. As shown in Fig. 3, each of the angle irons 25 and 26 is reinforced by a leg of a second angle iron 45 having one leg which lies against the outer face of the angle 26 and a second leg which projects inwardly to overlie the adjacent side of the shoe 23. The cam 43 operates between the angle 45 and the bar 41, serving to force the bar 41 outwardly when the cam is moved in the tightening direction. Conveniently, each clamp is mounted on a bolt 47 secured to the end plate 27 and has an operating handle 48 by which it may be rotated. In order to relieve the bolts 47 of strain, the cams 43 have loose fits thereon.

When the cams 43 are tightened, the bars 41 will be forced outwardly relative to the angle irons 25 and 26. Such outward effort applied to the bar 41 is transmitted through the bolts 40 to the sides of the shoe 23, and the sides 23 are thereby clamped against the angle irons 25 and 26. To change the adjustment of the bearing 21, the handles 48 are swung in the releasing direction to relieve the bars 41 and bolts 40 of outward effort, whereupon the handle 39 and cam 36 may be moved to raise or lower the shoe 23 and the bearing 21 carried thereby. With the shoe 23 in its new position, handles 48 are rotated to rotate the cams 43, apply outward effort to the bars 41 and bolts 40, and clamp the shoe 23 in its new position.

In the standard machine, for use in which my invention has been specifically developed, certain elements of the combine at the left-hand end of the housing in Fig. 2 prevent the presence of the adjusting cam 36 and the two clamping handles 48 such as are used at the right-hand end of the housing. Therefore, at the left-hand end of the housing I retain the adjusting screw 32 of the standard machine, but in order to facilitate its adjustment, I may affix to the nuts 34 a T-shaped wrench 50 which extends upwardly beyond the top wall of the housing 10 so that it can be rotated to adjust the nuts 34.

Figure 4:
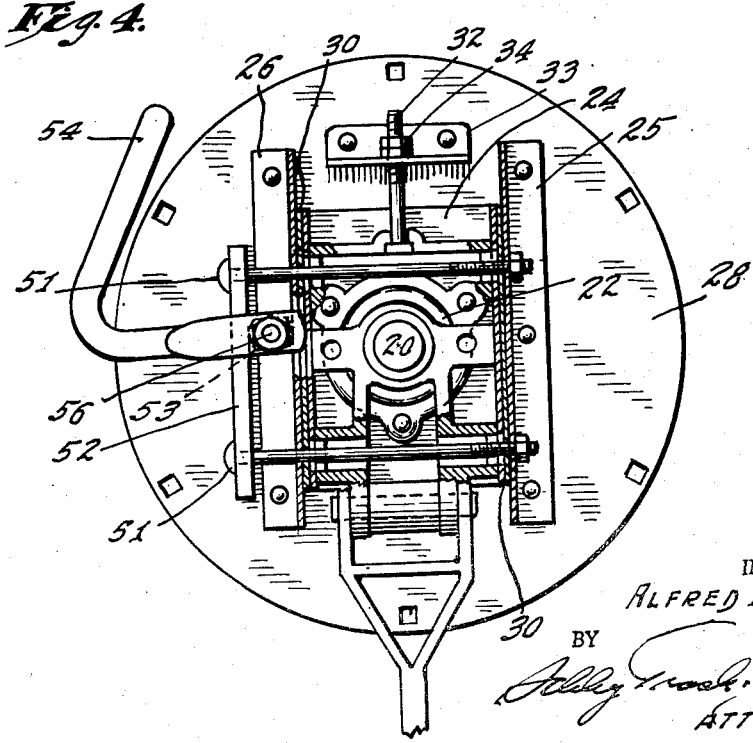
Fig. 4 is an end elevation of the opposite end of the chamber illustrating the means employed for adjustably supporting the bearing at the opposite end of the bearing cylinder.

As at the right-hand end of the machine, the conventional clamp-bolts employed to hold the shoe 24 in adjusted position are eliminated at the left-hand end of the housing and are replaced by bolts 51 which extend through the slots in the sides of the shoe 24 and through the holes in the shims 30 and in the parallel legs of the angles 25 and 26. Beyond one of such angles shown in Fig. 4 as the angle 26, the bolts 51 extend through a rigid bar 52 between which end the opposed flange or leg of the angle 26 there is disposed a rotatable clamping cam 53 having an integral handle 54 by which it may be rotated. As in the case of the locking cams 43, the cam 53 is loosely mounted on a pivot bolt 56 projecting outwardly from the end plate 28.

When the cam 53 is in its clamping position, it urges the bar 52 outwardly or to the left (Fig. 4) relative to the angle iron 26. Such leftward effort is transmitted from the bar 52 through the bolts 51 to the shoe-engaging leg of the angle iron 25. As a result, the cam 53 forces the shoe-engaging flange of the angle iron 26 into clamping engagement with the adjacent side of the shoe 24, while the bolts pull the shoe-engaging flange of the angle iron 25 into clamping engagement with the adjacent side of the shoe 24.

In operating the cylinder-positioning mechanism at the left-hand end of the housing 10, the cam-handle 54 is swung to release the effort applied to the bar 52 and angle iron 26 by the cam 53, thus freeing the shoe 24 for vertical adjustment, which can be effected by rotation of the wrench 50. When the shoe 24 has been positioned in the desired new location, the handle 54 is swung in the locking direction to cause the cam 53 to reapply the locking effort.

I regard as an important feature of my invention the loose fit of the locking cams 43 and 45 on their respective pivot bolts. Such looseness of fit is great enough to insure that the locking cams will act with substantially equal force upon the two members between which they are located and that the pivot bolts will serve merely to locate the cams and will be relieved of all but incidental effort in the clamping action.

I claim as my invention:

1. In a grain-threshing apparatus including a threshing cylinder, an associated concave, and means for adjustably positioning said cylinder relative to said concave, said means including a guideway positioned adjacent each end of the cylinder, a shoe guided by each guideway for sliding movement radially of said concave, said cylinder being rotatably supported from said shoes, a clamping device for locking the shoe in fixed position in its guideway, said clamping device embodying a quick-acting, rotatable clamping cam and a stationary pivot member on which the cam is rotatably mounted, said cam having a pair of diametrically opposite cam faces one of which engages a part to be subjected to the clamping effort, a rigid bar engaging the other of such cam faces, and tension-transmitting means connecting said bar to the other part to be subjected to the clamping action, said cam fitting said pivot member loosely, whereby it may exert substantially equal clamping efforts at its respective faces.

2. The invention of claim 1 with the addition of cam means for adjusting said shoe along its guideway.

3. In a grain-threshing apparatus including a threshing cylinder, an associated concave, and means for adjustably positioning such cylinder relative to said concave, said means including a guideway positioned adjacent each end of the cylinder, a shoe guided by said guideway for sliding movement radially of said concave, said shoe and guideway having at each side of the shoe cooperating flanges providing engaging plane surfaces substantially parallel to the axis of said cylinder, bolts extending through the shoe and guideway flanges at each side of the shoe and through a rigid bar spaced from the guideway flange, said cylinder being rotatably supported from said shoes, and a clamping device for exerting a clamping effort in a direction transverse to the axis of said cylinder for locking each shoe in fixed position in its guideway, at least one of said clamping devices including a cam located between said bolts and having a pair of diametrically opposite cam faces for respectively applying oppositely directed forces to said bar and guideway flange.

4. In a grain-threshing apparatus including a threshing cylinder, an associated concave, and means for adjustably positioning such cylinder relative to said concave, said means including a guideway positioned adjacent each end of the cylinder, a shoe guided by said guideway for sliding movement radially of said concave, said guideway having a pair of spaced, parallel flanges between which said shoe is received and engaging said shoe over plane surfaces substantially parallel to the axis of said cylinder, a pair of bolts extending through said flanges and through a rigid bar spaced outwardly from and parallel to one of said flanges, said cylinder being rotatably supported from said shoes, and a clamping device for exerting a clamping effort in a direction transverse to the axis of said cylinder for locking each shoe in fixed position in its guideway, at least one of said clamping devices including a cam disposed between said bolts and having a pair of diametrically opposite cam faces for forcing said bar and the adjacent flange apart and thereby drawing the flanges together to clamp the shoe between them.

References Cited in the file of this patent

UNITED STATES PATENTS

| | | |
|---|---|---|
| 679,413 | Bunker | July 30, 1901 |
| 1,582,213 | Golden | Apr. 27, 1926 |
| 2,376,618 | Paradise et al. | May 22, 1945 |
| 2,425,943 | Krause | Aug. 19, 1947 |
| 2,681,065 | Worden | June 15, 1954 |